(12) United States Patent
Mellere et al.

(10) Patent No.: US 12,261,503 B2
(45) Date of Patent: Mar. 25, 2025

(54) ELECTRIC MOTOR COMPRISING A HOUSING WITH A STATOR OVERMOLDING AND CONNECTION ASSEMBLIES

(71) Applicant: Sonceboz Mechatronics Boncourt SA, Boncourt (CH)

(72) Inventors: Cédric Mellere, Soulce Cernay (FR); Jean-François Place, Pierrefontaine-les-Blamont (FR)

(73) Assignee: Sonceboz Mechatronics Boncourt SA, Boncourt (CH)

( * ) Notice: Subject to any disclaimer, the term of this patent is extended or adjusted under 35 U.S.C. 154(b) by 75 days.

(21) Appl. No.: 17/757,139

(22) PCT Filed: Dec. 7, 2020

(86) PCT No.: PCT/EP2020/084913
§ 371 (c)(1),
(2) Date: Jun. 9, 2022

(87) PCT Pub. No.: WO2021/116029
PCT Pub. Date: Jun. 17, 2021

(65) Prior Publication Data
US 2023/0006503 A1 Jan. 5, 2023

(30) Foreign Application Priority Data
Dec. 10, 2019 (FR) ...................................... 1914080

(51) Int. Cl.
*H02K 5/22* (2006.01)
*H02K 3/52* (2006.01)
(Continued)

(52) U.S. Cl.
CPC ............. *H02K 5/225* (2013.01); *H02K 3/525* (2013.01); *H02K 5/08* (2013.01); *H02K 5/10* (2013.01)

(58) Field of Classification Search
CPC .......... H02K 5/225; H02K 3/525; H02K 5/08; H02K 5/10
(Continued)

(56) References Cited

U.S. PATENT DOCUMENTS

2018/0083516 A1\* 3/2018 Endo .................. H02K 15/0068

FOREIGN PATENT DOCUMENTS

| CH | 699082 A1 | 1/2010 |
|---|---|---|
| DE | 102007022070 A1 | 11/2008 |

(Continued)

OTHER PUBLICATIONS

International Search Report for International Application No. PCT/EP2020/084913 dated Feb. 24, 2021, 2 pages.
(Continued)

*Primary Examiner* — Jose A Gonzalez Quinones
(74) *Attorney, Agent, or Firm* — TraskBritt

(57) ABSTRACT

A motor comprises a housing having a cylindrical recess for receiving and centering a cylindrical wound stator. The stator has an overmolded electrical connection assembly with connecting tabs extending transversely. The stator, being equipped with the electrical connection assembly, is overmolded with an electrically insulating resin. The housing has a lateral protrusion for connecting with a complementary connection assembly. The housing has, in its rear portion, a first angular wedging means complementary to a second angular wedging means provided at the rear portion of the overmolded electrical connection assembly.

12 Claims, 10 Drawing Sheets

(51) Int. Cl.
*H02K 5/08* (2006.01)
*H02K 5/10* (2006.01)
(58) Field of Classification Search
USPC ..................................................... 310/43, 71
See application file for complete search history.

(56) References Cited

FOREIGN PATENT DOCUMENTS

| | | | |
|---|---|---|---|
| FR | 2923951 A1 | 11/2009 | |
| FR | 2996072 B1 | 7/2016 | |
| JP | 2010061957 A * | 3/2010 | |
| WO | 97/16883 | 5/1997 | |
| WO | WO-9716883 A1 * | 5/1997 | ............. H02K 11/33 |

OTHER PUBLICATIONS

International Written Opinion for International Application No. PCT/EP2020/084913 dated Feb. 24, 2021, 8 pages.

* cited by examiner

ELECTRIC MOTOR COMPRISING A HOUSING WITH A STATOR OVERMOLDING AND CONNECTION ASSEMBLIES

CROSS-REFERENCE TO RELATED APPLICATIONS

This application is a national phase entry under 35 U.S.C. § 371 of International Patent Application PCT/EP2020/084913, filed Dec. 7, 2020, designating the United States of America and published as International Patent Publication WO 2021/116029 A1 on Jun. 17, 2021, which claims the benefit under Article 8 of the Patent Cooperation Treaty to French Patent Application Ser. No. 1914080, filed Dec. 10, 2019.

TECHNICAL FIELD

The present disclosure relates to a polyphase electric motor, in particular, for electrical control applications of mechanical components such as clutches in industry, for motor vehicles and commercial vehicles, replacing hydraulic or pneumatic control solutions.

BACKGROUND

In the industrial field, the choice of a polyphase motor is made based on criteria of cost, performance and service life. Performance is evaluated primarily on the basis of efficiency and reliability. To achieve good efficiency, it is necessary to have a sufficient volume of copper in order to limit Joule losses, and a short magnetic circuit to minimize iron losses. The cost of the motor is linked to the cost of the materials, but also to the production cost, and it is particularly important to propose an economical solution for producing the winding and assembling the motor and the sub-assemblies.

For the electrification of controls that were previously hydraulic or pneumatic, it is necessary to have powerful, reliable, robust and compact actuators.

Known in the state of the art is Japanese patent JP2010061957 proposing a motor equipped with a female connector forming the port for inserting a male connector.

The housing has an opening provided with a transverse groove referenced into which is inserted a projecting lug referenced provided on a terminal block referenced. This terminal block is connected to the stator by a cable referenced, extending between the motor and the terminal block. This construction does not in any way ensure the centering and angular wedging of the motor relative to the housing.

Also known is German patent DE102007022070, which describes a solution of a motor and a connector attached to the stator comprising electrical contacts projecting radially outward. This connector can be snapped into part of a housing formed by assembling several parts.

Swiss patent CH699082B1 describes an electric motor comprising a casing, a stator that is fixed relative to the casing, a rotor mounted on bearings and rotating relative to the stator and the casing, the stator comprising a magnetic circuit surrounding the rotor and a plurality of coils, each surrounding a corresponding radial arm of the magnetic circuit arranged around the rotor, the motor further comprising a connector for interconnecting the coils to an external power supply. The connector is in the form of a connector pluggable with a complementary connector of an external power supply system.

Patent application WO9716883 describes another embodiment of a motor with a side electrical connector.

The solutions of the prior art are not completely suitable for the mass production of actuators and motors with very great robustness, having precision of assembly and simplicity of automated manufacture.

BRIEF SUMMARY

The present disclosure relates to the field of electromagnetic actuators using a multi-phase, in particular, three-phase, wound stator structure comprising a rotor position sensor. The present disclosure relates, in particular, to the connection of the electrical signals between the motor assembly (stator+rotor) and the electrical interface of the application.

The present disclosure proposes to solve a set of problems resulting from the electrical connection operation between two multitrack (several tracks) connection networks (called leadframes): one belonging to a stator of a motor assembly and the other to the control member (power and signal) of the application.

The solutions of the prior art generally have several problems:

Difficulty in ensuring precise positioning of the connection network ("leadframe") of the motor assembly relative to the connection network of the application.

Difficulty in producing and manufacturing power connection networks for economical and robust motor assemblies.

Difficulty in transmitting high levels of electrical power (>1 kW) economically and reliably.

Difficulty in fitting ancillary elements on the power connection network of the motor assembly, such as the sensor signal networks, a possible magnetic shielding plate, a stator fitted with coils for an assembly overmolding operation.

Lack of reliability of the electrical connections between the power connection network and the motor assembly stator coils.

More particularly, the present disclosure relates to applications where the electrical connections between the motor assembly and the control/power supply components do not require a standard connector (integrated or "pigtail" type), but a network of rigid copper alloy tracks ("leadframes").

In order to address these drawbacks, the present disclosure relates, in its most general sense, to a motor comprising a housing having a cylindrical recess for receiving and centering a cylindrical wound stator. The stator has an electrical connection assembly with transversely extending connecting tabs. The housing has a lateral protrusion for connection with a complementary connection assembly. The stator, fitted with the electrical connection assembly, is overmolded with an electrically insulating resin. The housing has, in its rear part, a first angular wedging means complementary to a second angular wedging means provided at the rear part of the overmolded electrical connection assembly. The present disclosure also relates to a method for manufacturing such a motor.

In order to meet the objective of robustness and taking into account the constraints of automated industrial production, the present disclosure generally results in a motor designed to allow simplified mechanical and electrical assembly of three sub-assemblies, namely a rotor, a stator block provided with the connectors and a housing, the stator block and the housing each forming a rigid one-piece block, with no moving parts liable to disturb the assembly.

The stator block and the housing are designed to be complementary by a simple assembly ensuring the omnidirectional and, in particular, angular positioning and the mechanical wedging after engagement of the stator block in the housing. The rotor is designed to allow axial insertion into the stator block.

To give the stator a "one-piece block" configuration, at least the upper part of the stator, the connectors and the printed circuit boards carrying the magnetic detection probes are enclosed in a resin covering all of these elements in such a way as to link them inseparably with the stator sheets.

BRIEF DESCRIPTION OF THE DRAWINGS

The present disclosure will be better understood on reading the description that follows, with reference to the accompanying drawings, where.

DETAILED DESCRIPTION

Construction Detail of the Stator Block

The motor assembly comprises a rotor positioned in the longitudinal cavity of a stator block formed by a monolithic housing (100), with a tubular body closed by a bottom and open at its opposite end, to assume the general shape of a pot. This housing (100) is formed from a single piece, preferably molded, to form an enclosure of the electromechanical part providing mechanical and electrical protection and sealing thereof, and having fasteners on a complementary equipment item.

The upper part of the housing (100) has an axial opening (110) for introducing and positioning the overmolded stator (200) and a radial opening (120) for making the electrical connection with the external connector connected to a multiconductor cable ensuring the power supply and the bidirectional transmission of service signals (command, servo-control, position, etc.).

Figure 11:
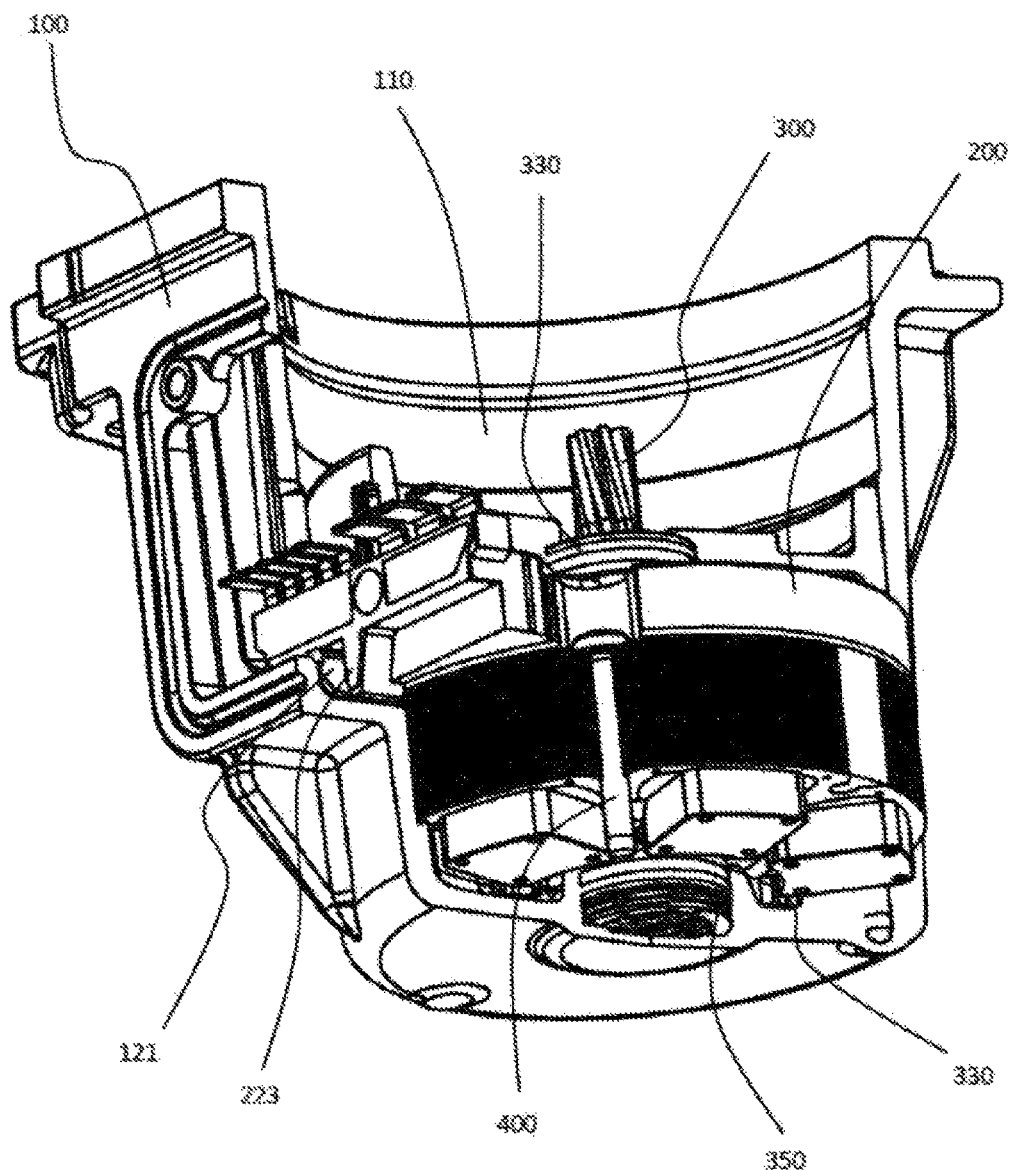
FIG. 11 shows a three-quarter perspective top view and partial section of the motor and the rotor guides.

The stator (200) is equipped with a stator lamination with an electrical connection network, and two printed circuit boards (71, 72) equipped with Hall probes, possibly a shielding plate, the electrical connection network (220) and the printed circuit boards (71, 72) equipped with Hall probes and an electrical connection assembly (250), all these elements being overmolded with an electrically insulating resin, at least partially encompassing the upper part of the lamination, to form a rigid encapsulated block. The overmolded stator (200) is mechanically attached to the housing (100) by a tight fit (force driving or shrinking) and fastening screws (400), visible in FIGS. 2 and 11. The overmolded stator (200) forms a rigid block with no moving parts intended to be housed in the housing (100) and to receive the rotor. The stator is rigidly linked to the connector by overmolding, without connection by a flexible cable.

The edge of the window (120) has a protruding index (121) extending axially, the upper edges of the index (121) being beveled.

The overmolding of the connection zone (220) of the stator has a cavity complementary to the index (121), defined by two shoulders (222, 223) forming a fork engaging on the index (121) when the overmolded stator is moved axially toward the bottom of the housing (100).

The index (121) of the housing forms an angular wedging means with the complementary shoulders (222, 223) that ensures the precise and robust positioning of the overmolded stator (200) with respect to the housing (100).

The overmolding of the upper part of the stator, and, in particular, of the connection zone (220) of the stator, also has an index (230) extending perpendicularly to the cross-section. This index (230) is used to ensure the positioning of the complementary connector coming to engage in the housing (100) by a vertical movement.

The window (120) of the housing makes it possible to connect the conductive tracks of the network ("leadframe") with the conductors of the complementary connector, for example, by soldering, before being closed by a protective plate ensuring the closure and the sealing.

Figure 1:
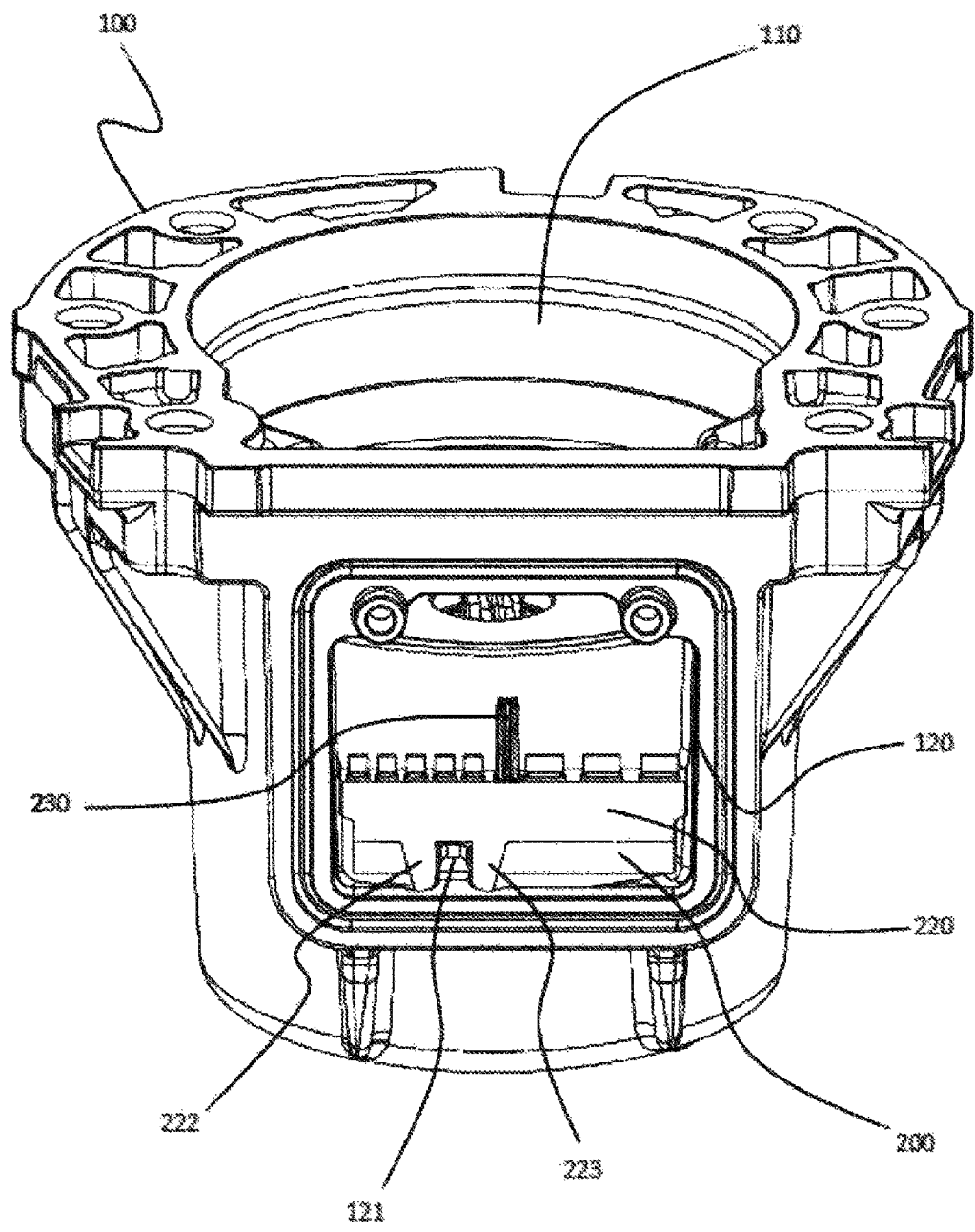
FIG. 1 shows a three-quarter top perspective view of the motor in its housing.
Figure 2:
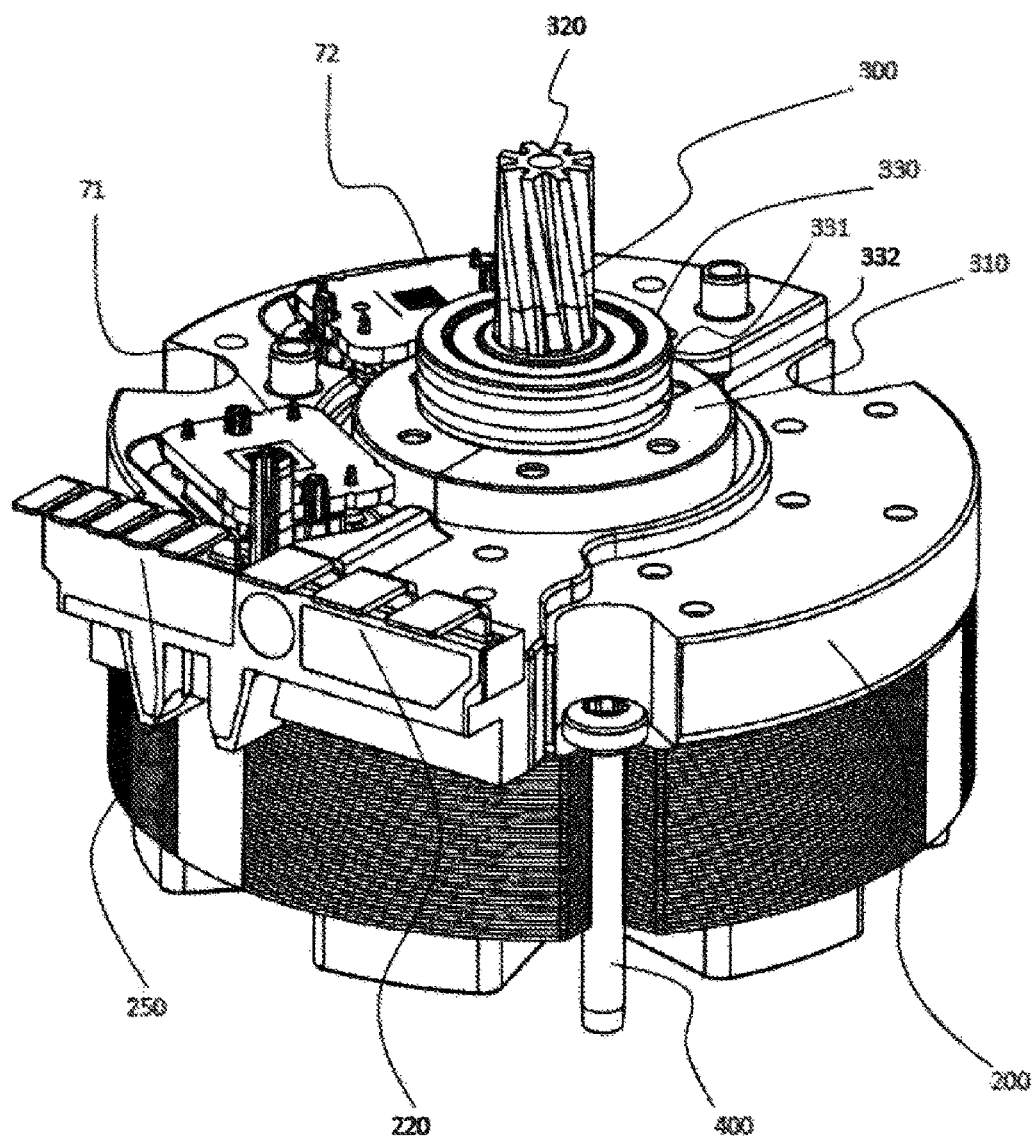
FIG. 2 shows a three-quarter top perspective view of the motor assembly (rotor-stator-sensor).

FIG. 2 shows the overmolded stator (200). The overmolded part includes a first power connection network (220) and, in the described example, a second signal connection network (250) receiving two printed circuit boards (71, 72) equipped with Hall probes for detecting the position angle of the rotor (300). The Hall probes detect the magnetic field emitted by a sensor magnet (310) secured to the axis (320) of the rotor (300), the axis being carried and guided in rotation by bearings (330) equipped with elastically deformable seals (331, 332) located on the outer ring of the bearing.

In order to limit the vibrations and displacements experienced by the rotor (300) in operation, a prestress washer (350) is inserted between the bearing (330) and the housing (100). This elastic washer (350) applies an axial preload F with an axial stiffness K on the rotor (300), the force F and the stiffness K being dimensioned and chosen according to the mass of the rotor (300) and the external vibratory disturbances.

Production of Connection Networks

Although the present disclosure is not limited to the variant described below, the connection network being able to be produced in different ways, for example, as proposed in French patent FR2996072 or FR2923951, the present disclosure proposes a new solution for a coil connection network.

This solution is not limited to an embodiment of a motor providing for indexing of the stator with respect to the housing, and can be applied to any type of multiphase electric motor stator.

The stator comprises two connection networks, one for power for the connections between the tabs (20, 30, 40) of the electrical phase power connector, and the other for the connection with the magnetosensitive probes.

Figure 3:
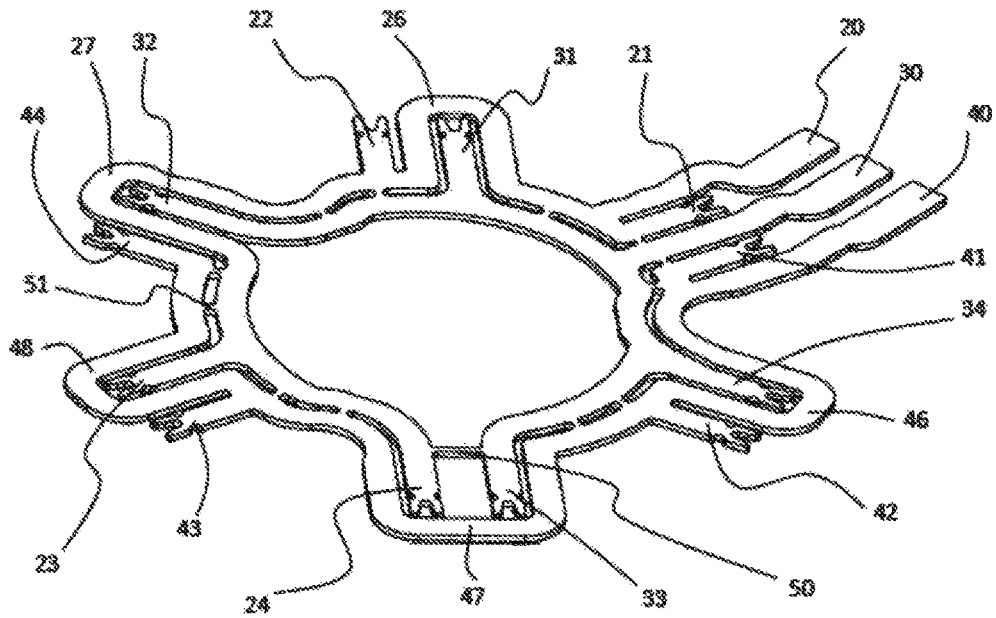
FIG. 3 shows a view of the strip cutting of the power connection network, before bending.
Figure 4:
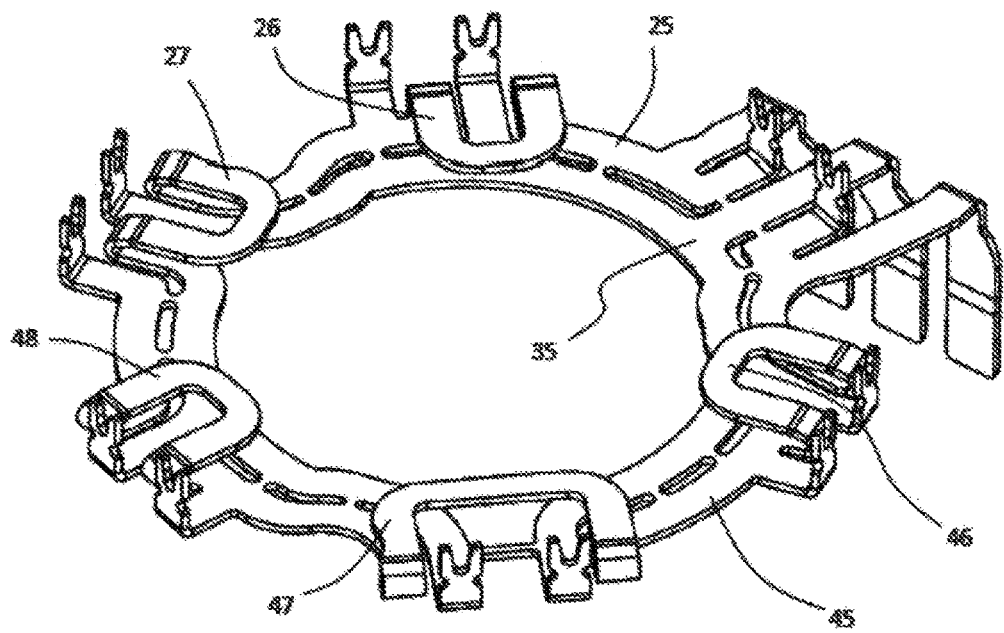
FIG. 4 shows a perspective view of the connection network after a first shaping step by bending.

As can be seen in FIGS. 3 and 4, the three-phase connection network is cut out of a sheet of conductive material, for example, copper, the thickness of which is determined according to the current required for the power supply of the electric coils of the stator.

To ensure the integrity of the tracks after cutting, for example, by stamping or laser or water jet cutting, the conductive tracks forming the three phases of the motor with the coils, which must normally be independent and electrically insulated, are temporarily maintained by bridges (50, 51) that will then be cut out once the overmolding operation of the connection network has been carried out (the connection network possibly comprising more than 2 bridges).

Each phase is associated with a conductor terminated by a connecting tab (20, 30, 40), respectively, and having semi-annular segments (25, 35, 45) and four linking tabs (21 to 24, 31 to 34 and 41 to 44), respectively, for welding or coupling by "press-fit" with the wires of the electric coils.

The conductor for the first phase, corresponding to the connecting tab (20), is in the form of a first linking tab (21) with one of the wires of the corresponding coil, extending between the connecting tabs (20, 30) of the first and second phase, and of a partial ring (25) extending over approximately 240°, up to a fourth linking tab (24). It comprises a second (22) and third (23) linking tab with the wires of the corresponding coils.

This partial ring (25) has radial protrusions (26, 27) in the form of loops bypassing the linking tabs (31, 32) of the second conductor.

The third conductor terminating in the connecting tab (40) has a substantially mirror configuration with respect to the first conductor. It has a linking tab (41) located between the second tab (30) and the third tab (40), and is extended by a partial ring (45) extending over 240° to a fourth linking tab (44). It comprises a second (42) and third (43) linking tab with the wires of the corresponding coils.

This partial ring (45) has radial protrusions (46, 47, 48) in the form of loops bypassing the linking tabs (34, 24 and 33, 23) of the second and third conductors.

The central conductor corresponding to the second phase and terminated by the connecting tab (30) has an inner annular segment (35) with linking tabs (31, 32, 33, 34) extending inside the protrusions (26, 27, 46, 47).

This configuration is made by cutting (stamping) in a single operation in one and the same metal strip of the 3 phases.

Figure 6:
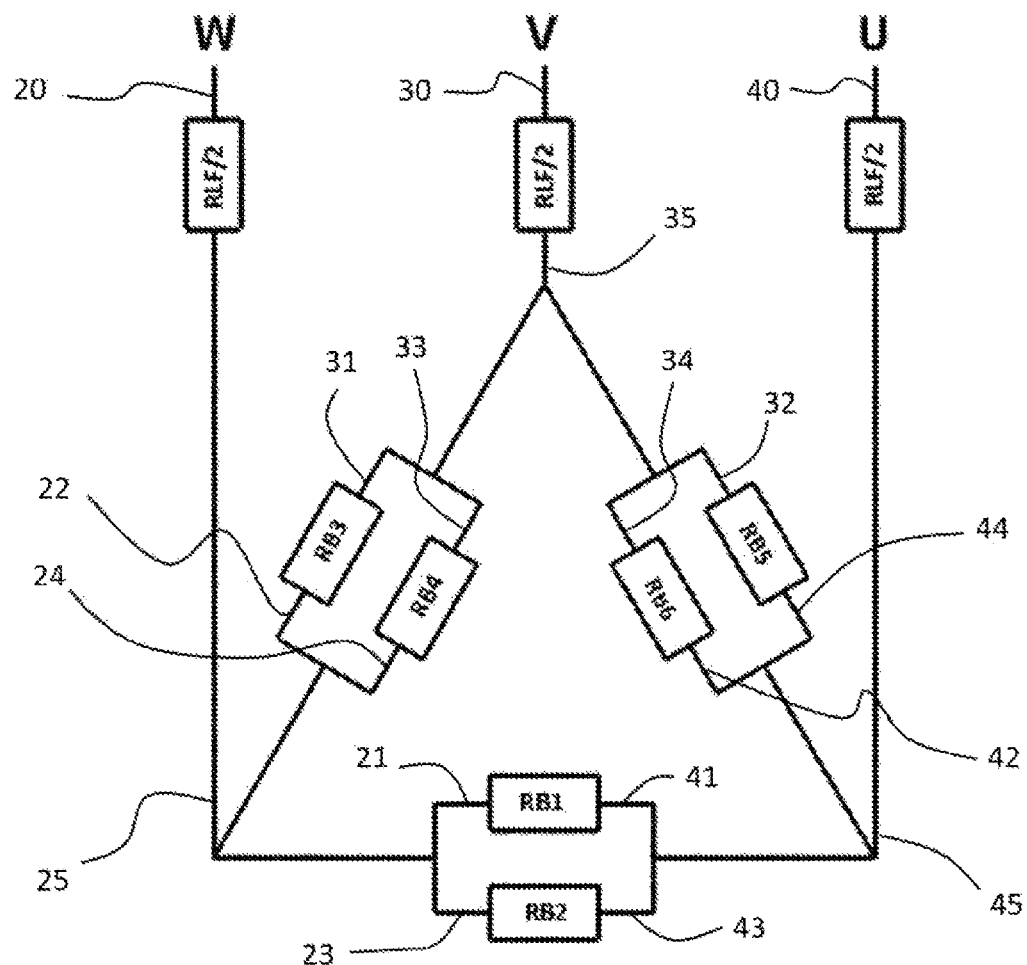
FIG. 6 shows an electrical diagram of the stator produced by the power connection network and the coils.

During this first manufacturing step, a sheet of conductive material is cut to present a configuration corresponding to the electrical topology sought for the connection of the stator coils. A preferred embodiment is shown in the diagram of FIG. 6 with a "parallel delta" type connection (RB1 to RB6 symbolizing the coils of the stator). Other preferred embodiments according to the present disclosure such as "series delta," "parallel star," "series star" are also possible. More generally, the following characteristics for a three-phase motor with 2.N coils (6 coils, for example) are preferred:

Three tracks of generally constant width, within ±10%, the width and the thickness being defined according to the electrical power required.

Each of the tracks has one end forming a connecting tab (20, 30, 40), extending toward a connection zone.

The first and third tracks have an alternation of annular segments and radial protrusions, and extending over an arc of approximately 240°.

The second track has an alternation of annular segments and linking tabs that are positioned in the hollow space delimited by the radial protrusions of the first and third tracks.

Each of the tracks has one or more linking tabs for connection with a wire of an electric coil, the tabs extending in centrifugal directions.

The three tracks are temporarily connected by breakable bridges.

Figure 5:
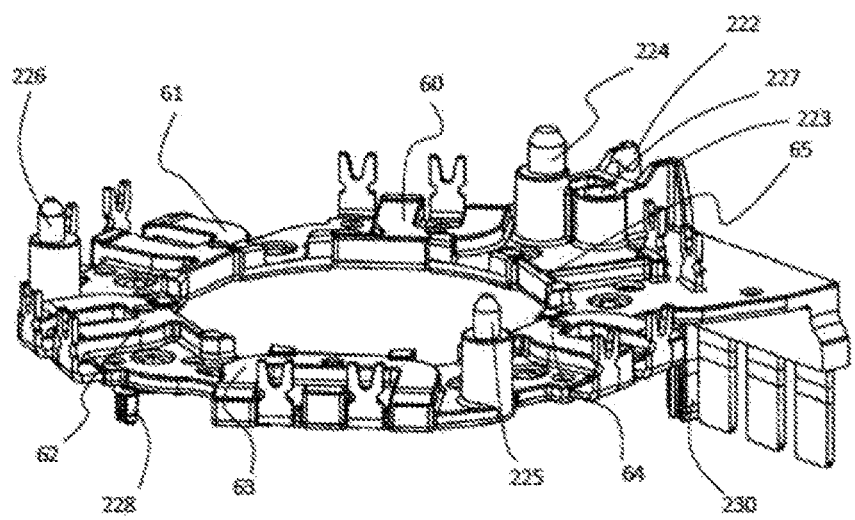
FIG. 5 shows a perspective view of the connection network after overmolding, with the support zones.

The next step, illustrated by FIG. 4, involves folding back the radial protrusions and the linking tabs by one or more successive bending operations. In order to obtain the 2.N electrical interfaces with the coils on the outer periphery of the connection network, the linking tabs (21 to 24, 31 to 34, 41 to 44) are bent to be brought into the axial position at an angle of approximately 90° with respect to the plane defined by the strip cut in the previous step. This simple bending step allows good control of the positioning of the linking tabs for the connection with the coil wires. The radial protrusions (26, 27, 46, 47, 48) are then bent approximately 180° inward (or outward) to thereby be folded under and into the projected surface of the power supply connection network, which avoids increasing the space requirement. This 180° bending induces a local increase in the thickness of the connection network that is used to manage the supports (60 to 65), visible in FIG. 5, intended to come onto the coil bodies during the electric welding operation: these supports provide better rigidity in compression and avoid excessive plastic volumes/thicknesses in the functional areas of the supports (contraction, shrinkage, imprecise dimensions). During overmolding, the plastic is injected into the volumes defined between the curved protrusions and the tracks to form areas for wedging the coils, as shown in FIG. 5.

Furthermore, the connecting tabs (20, 30, 40) are, in the example described, folded downward at 90°, while the linking tabs with the wires of the coils are folded at 90° in the opposite direction, upward.

The radial protrusions (26, 27, 46, 47, 48), requiring a more complex and therefore by definition less precise folding, do not comprise any connection element such as linking tabs or connecting tabs. Thus, during the bending operation of the protrusions, the positioning precision of the tabs, bent at 90°, is not reduced by the deformation effect.

Figure 7A:
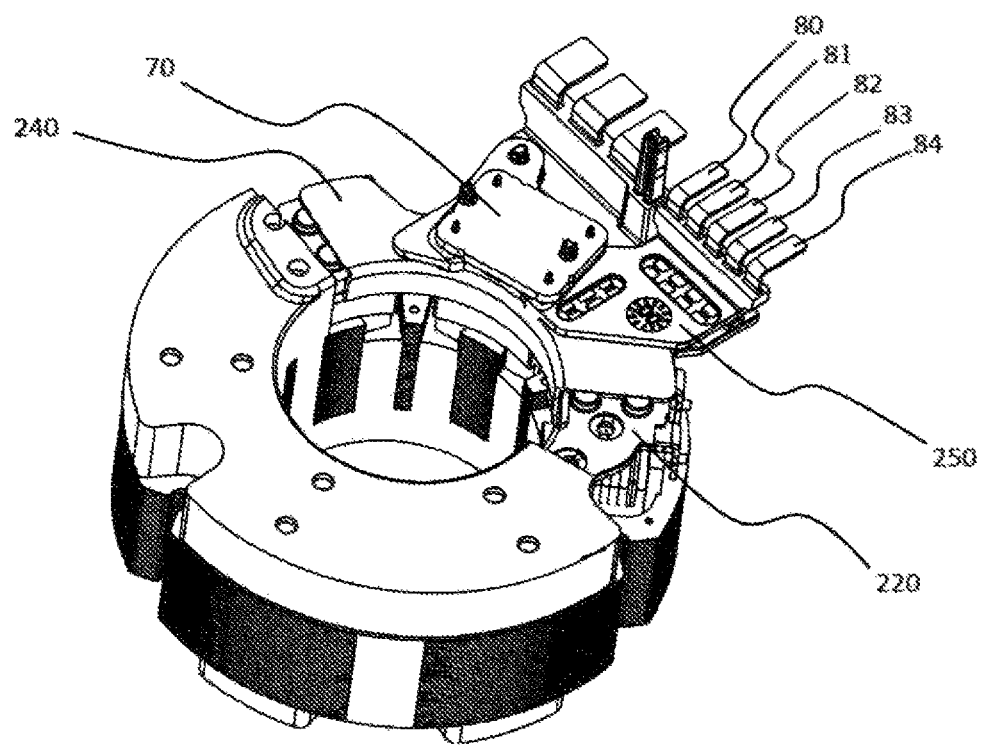
FIG. 7A shows a perspective and partial sectional view of the stator equipped with the power connection network and the signal connection network in the single sensor version.
Figure 7B:
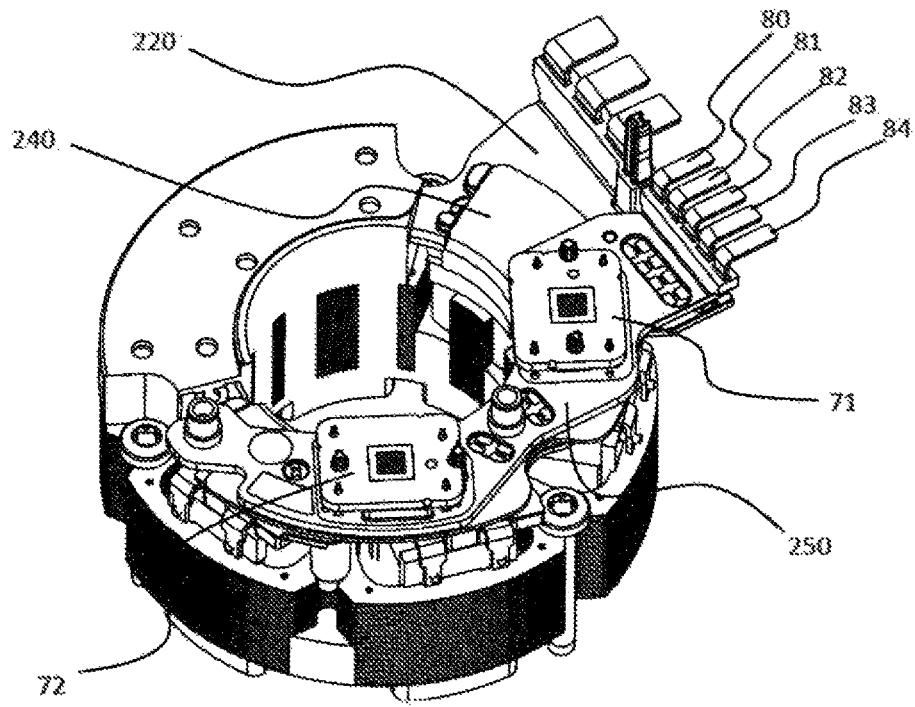
FIG. 7B shows a perspective and partial sectional view of the stator equipped with the power connection network and the signal connection network in the double sensor version.

FIGS. 7A and 7B show a view of the stator (200), at least the upper part of which is overmolded. This upper part of the rotor includes the second "signal"-type connection network (250) consisting of a set of molded tracks and integrating a printed circuit board (70, 71, 72) on which the Hall probes are soldered, the printed circuit board being attached and connected by press-fit on the second connection network. The second signal connection network further has connecting tabs (80 to 84) arranged close to the connecting tabs (20, 30, 40) of the first power connection network (220).

FIG. 7A is a first preferred embodiment where the second signal connection network (250) receives a single printed circuit board (70). FIG. 7B is a second preferred embodiment where the second signal connection network (250) receives two printed circuit boards (71, 72), in order to provide, for example, redundancy or better precision in the measurement of the angular position.

A shielding plate (240) is arranged axially between the second overmolded signal connection network (250) and the first overmolded power connection network (220), to limit the disturbances of the probes by the electromagnetic fluxes generated by the stator. This shielding plate (240) has a semi-annular shape completely covering the surface projected under the printed circuit boards (70, 71, 72).

Production of the Overmolded Stator

Figure 8:
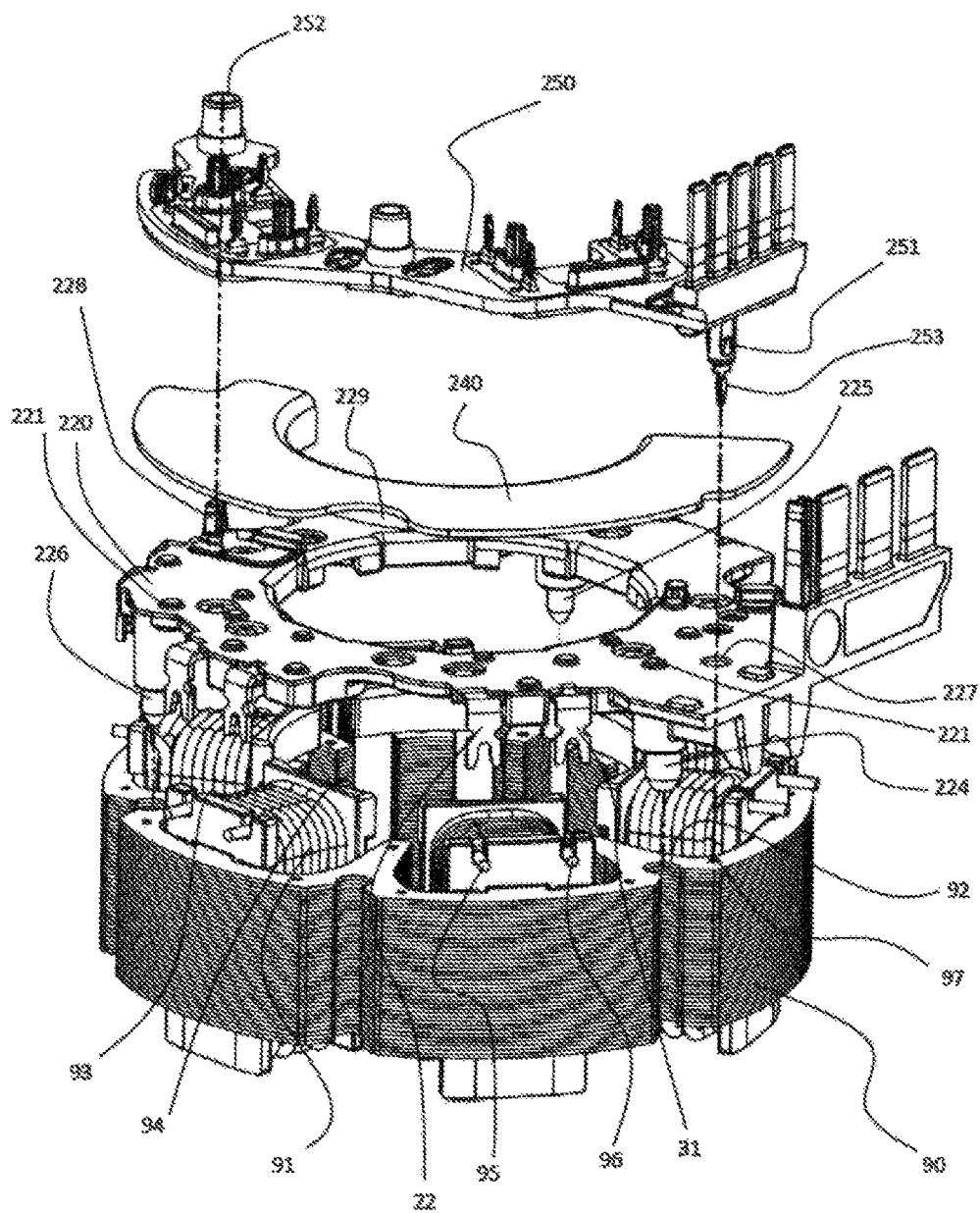
FIG. 8 shows an exploded view of the stator for assembling and positioning the power connection network, the shielding and the signal connection network.
Figure 9A:
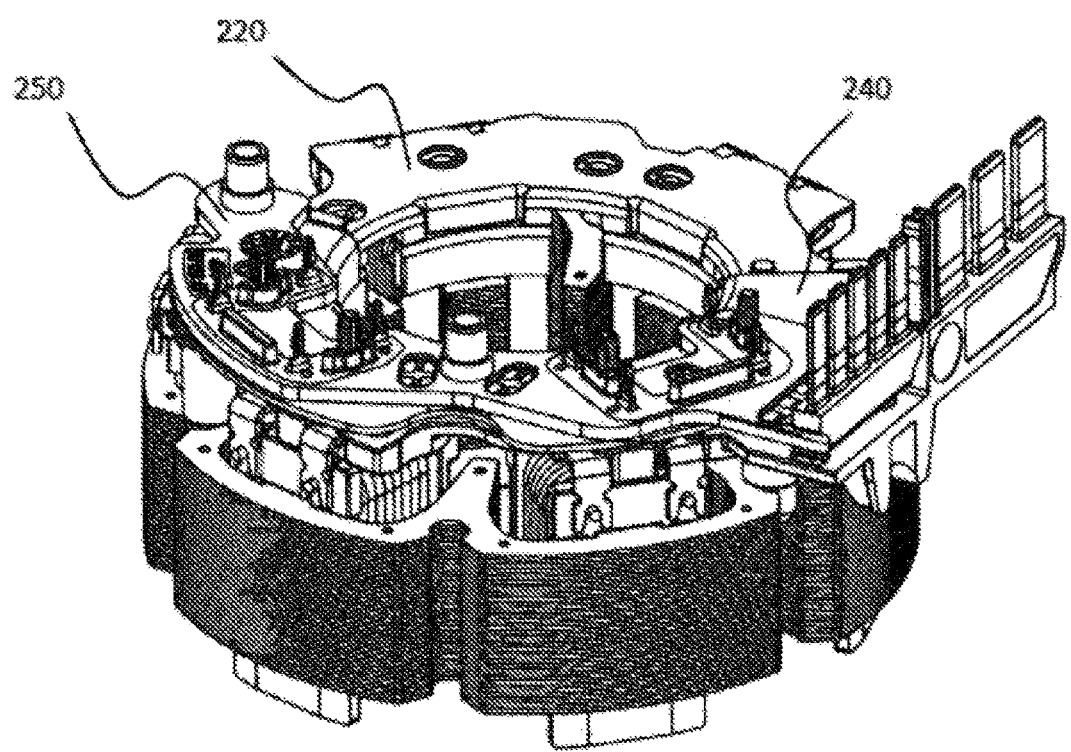
FIG. 9A shows a perspective view of the stator before overmolding.
Figure 9B:
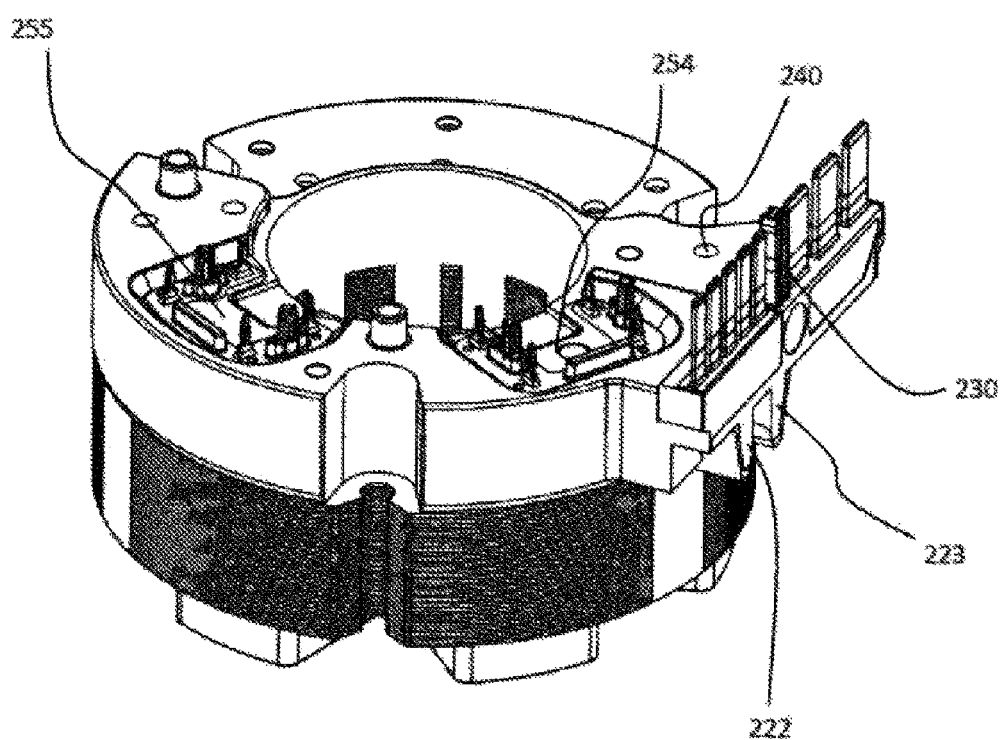
FIG. 9B shows a perspective view of the stator after overmolding.

The various stages of production of the overmolded stator (200) are shown in FIGS. 8, 9A and 9B. An iron circuit (90) produced by a stack of cut sheets incorporates coils (91). The overmolded power connection network (220) is positioned on the iron circuit (90) by a set of centering pins (224, 225, 226) engaging and collaborating with a plurality of complementary shapes (92) of the iron circuit, these complementary shapes (92) also being adapted to receive fastening screws (400) for holding the stator (200) in the housing (100). The axial stop of the overmolded power connection network (220) is ensured by bringing the supports (60 to 65), not visible here, into contact on the upper faces (93, 94) of the coil bodies (91). A precise, simple and robust positioning of the linking tabs (22, 31) relative to the coil wires (95, 96) is thus obtained in order to perform the electrical connection thereof, for example, by welding.

The overmolded stator (200) also comprises a second signal connection network (250) included in the overmolding and placed in position on the first power connection network (220) by a set of pins and centering holes (251, 252) engaging and collaborating with complementary shapes (227, 228). The centering pin of the second signal connection network (250) further incorporates an electrical connector element (253), for example, and not limited to the press-fit type, this connector element (253) being electrically connected to one of the connecting tabs (80 to 84), this connector element being adapted to be electrically connected to the iron circuit (90) by engaging, for example, and non-limitingly, a hole (97). This particularly ingenious electrical connection solution between one of the connecting tabs (80 to 84) of the second molded signal connection network (250) and the iron circuit (90) of the molded stator (200) makes it possible to electrically ground the stator (200) and the housing (100) with the external connector connected to a multi-conductor cable ensuring the power supply and the bidirectional transmission of the service signals (control, servo-control, position, etc.) and thus to guarantee good immunity to interference and surrounding electromagnetic emissions.

The overmolded stator (200) lastly includes, in the overmolding, a shielding plate (240) interposed between the first overmolded power connection network (220) and the second overmolded signal connection network (250). This shielding plate (240) made of ferromagnetic material, which makes it possible to separate and immunize the Hall probes integrated on the printed circuit boards (70, 71, 72) of the stator coils, is carried by the power connection network (220) by means of a system of gadroons (or "crush ribs") defining two lines of action oriented radially with respect to the stator. The plate is adjusted via an axial collar (229) in contact with plastic zones of the inside diameter of the overmolding of the power connection network and it is stopped axially via a plurality of bosses (221). The shielding plate (240) is locally visible after overmolding of the stator to be able to check its presence.

Once the stator has been fitted with the first power connection network (220), the shielding plate (240) and the second signal connection network (250), it is overmolded with an electrically insulating resin. A robust and massive overmolded stator (200) is thus obtained where only the positioning and electrical connection interfaces (254, 255) with the printed circuit boards (71, 72), the connecting tabs (20, 30, 40, 80 to 84), the index (230), the complementary cavity and the two shoulders (222, 223) and part of the shielding plate (240) are visible and accessible.

Assembly of the Overmolded Stator in the Housing

The inner section of the housing (100) is determined to ensure play-free wedging of the overmolded stator.

For assembly, the housing (100) is heated before the axial introduction of the stator, and if necessary angular repositioning is done for the mutual engagement of the wedging means.

Indexing of the Stator Relative to the Housing

The overmolded stator (200) is centered in the housing (100) by the outside diameter of its iron circuit (90).

The overmolded stator (200) is stopped axially on a reference surface of the housing by its iron circuit (90).

The overmolded stator (and therefore the electrical power and signal interfaces for connection with the application) is angularly oriented by the shoulders belonging to the power connection network (220).

The corresponding connection network of the electrical interface of the application can then be oriented and positioned directly by the bell-shaped housing (via precise machining collaborating with guide elements of the connection network of the application). Alternatively, the overmolded power connection network may comprise a second angular indexing element (230) in the form of a fitted plastic stud (side opposite the iron circuit of the stator) that can be engaged by a corresponding form of the connection network of the application and thus guarantee precise and robust positioning between the electrical interfaces of the motor assembly and the electrical interfaces of the application, completely freeing themselves from the dimensions and tolerances linked to the manufacture of the housing (100).

Motor Customization

In order to optimally adapt the motor controller to the manufacturing and assembly specificities of each motor, a particular variant of the present disclosure, not limited to the embodiments described above, consists in recording a set of electromechanical characteristics specific to the motor at the end of the construction of the considered motor, and for each motor, in recording the specific characteristics in the form of a matrix code affixed to the housing of the motor, or in the form of a digital recording in a computer memory.

Figure 10:
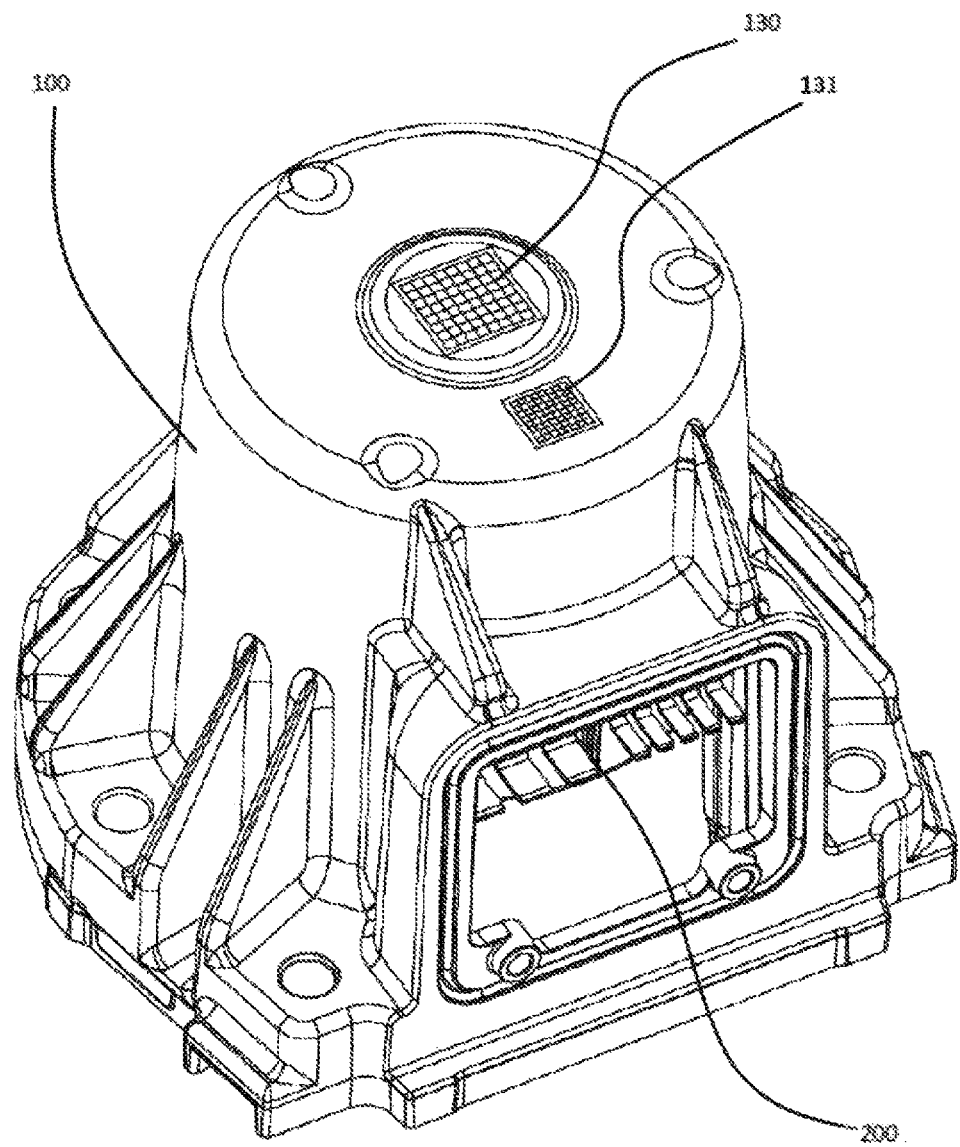
FIG. 10 shows a bottom three-quarter perspective view of the motor with the specific mechanical characteristics in matrix code form.

According to the present disclosure, FIG. 10 shows a housing (100) equipped with an overmolded stator (200). The rear face of the housing (100) comprises a matrix code (130, 131) of the DMC (Data Matrix Code), QR Code (Quick Response Code) or bar code type. This matrix code can be arranged on one or more areas of the face of the housing; it can be printed by ink jet, engraved by a laser or by a micro-percussion machine, or even adhered via a label.

These digital data are intended to be read by the control circuit that will control the motor during its integration into a system, and to parameterize the control law of the control circuit by taking into account the specificities of the controlled motor.

The invention claimed is:

1. A motor comprising a housing having a cylindrical recess located and configured to receive and center a cylindrical wound stator, the stator having an electrical connection assembly with transversely extending connecting tabs, the housing having a lateral protrusion for connection with a complementary connection assembly, wherein the stator, fitted with the electrical connection assembly, is overmolded with an electrically insulating resin to form a rigid block with no moving parts intended to be housed in the housing and to receive a rotor, said stator being rigidly linked to the electrical connection assembly by overmolding, without connection by a flexible cable, wherein the housing is formed from a single piece, with a tubular body closed by a bottom and open at its opposite end, the housing having an upper part with an axial opening for introducing and positioning the overmolded stator and a radial opening for making the electrical connection with an external connector, and wherein the housing has, in a rear part of the housing, a first angular wedging feature complementary to a second angular wedging feature provided at a rear part of the overmolded electrical connection assembly.

2. The motor of claim 1, wherein at least one of the angular wedging features has a chamfer configured to reduce play between the housing and the overmolded electrical connection assembly.

3. The motor of claim 1, wherein the first and second angular wedging features are oriented and engage in a direction parallel to the axis of the cylindrical recess of the housing.

4. The motor of claim 1, wherein the overmolded electrical connection assembly further has, on a front transverse surface of the overmolded electrical connection assembly, a positioning feature complementary to a wedging feature provided on a rear surface of a complementary connection subassembly.

5. The motor of claim 1, wherein the overmolded electrical connection assembly comprises a conductive sheet cut to form N tracks connected by breakable bridges and having radial protrusions curved at 180° in a plane parallel to a main plane of the tracks, the tracks having lateral extensions projecting from the overmolding.

6. The motor of claim 1, wherein the overmolded electrical connection assembly has, in a front part of the overmolded electrical connection assembly, a second track subassembly for connecting at least one printed circuit board supporting an electromagnetic sensor, a shielding plate being interposed between the second track subassembly and the overmolded electrical connection assembly.

7. The motor of claim 1, further comprising recording means for recording digital information corresponding to calibration parameters of a sensor specific to the motor, the recording means being able to be used by a computer of a configurable additional control circuit.

8. The motor of claim 7, wherein the recording means is a graphic code or a digital recording in an electronic memory.

9. The motor of claim 1, further comprising a zone for recording digital information corresponding to parameters specific to the motor.

10. The motor of claim 1, further comprising a rotor, and at least one pre-stress washer having a preload level determined to limit vibrations of a rotor.

11. The motor of claim 1, further comprising at least one bearing having at least one elastically deformable seal, wherein the seal is integrated between an outer ring of the bearing and a recess.

12. A method of manufacturing a motor according to claim 1, the method comprising: heating the housing before introducing an overmolded stator axially into the rotor, and angular positioning of the overmolded electrical connection assembly relative to the housing for the mutual engagement of the angular wedging features.

* * * * *